June 15, 1965    E. H. LUSEBRINK    3,189,729
PROCESS ROLL SYSTEM
Filed Nov. 29, 1962    2 Sheets-Sheet 1
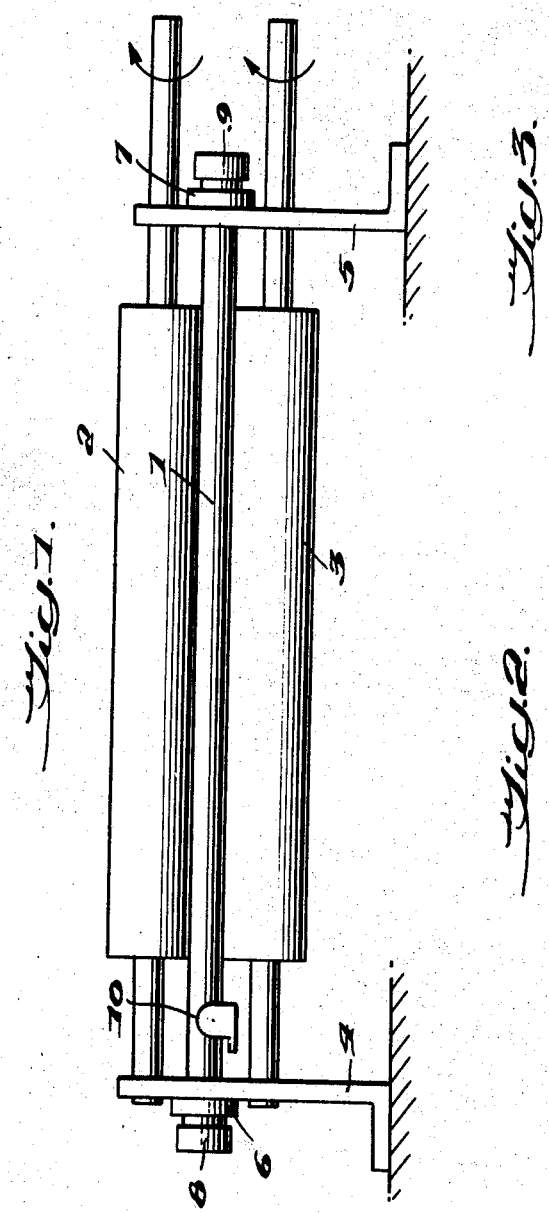
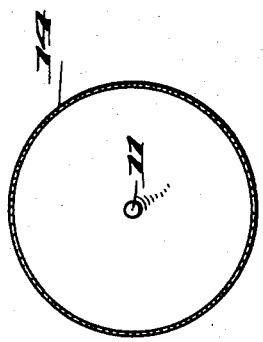
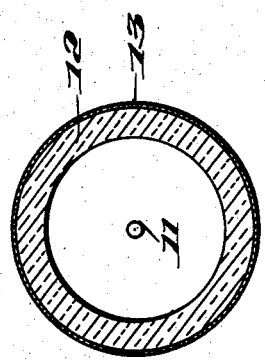
INVENTOR.
ELMER HENRY LUSEBRINK,
BY
AGENT June 15, 1965
E. H. LUSEBRINK
3,189,729
PROCESS ROLL SYSTEM
Filed Nov. 29, 1962
2 Sheets-Sheet 2
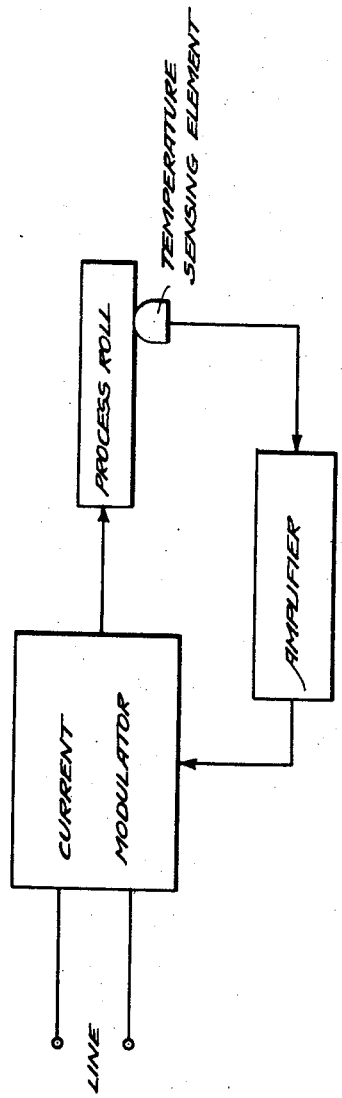
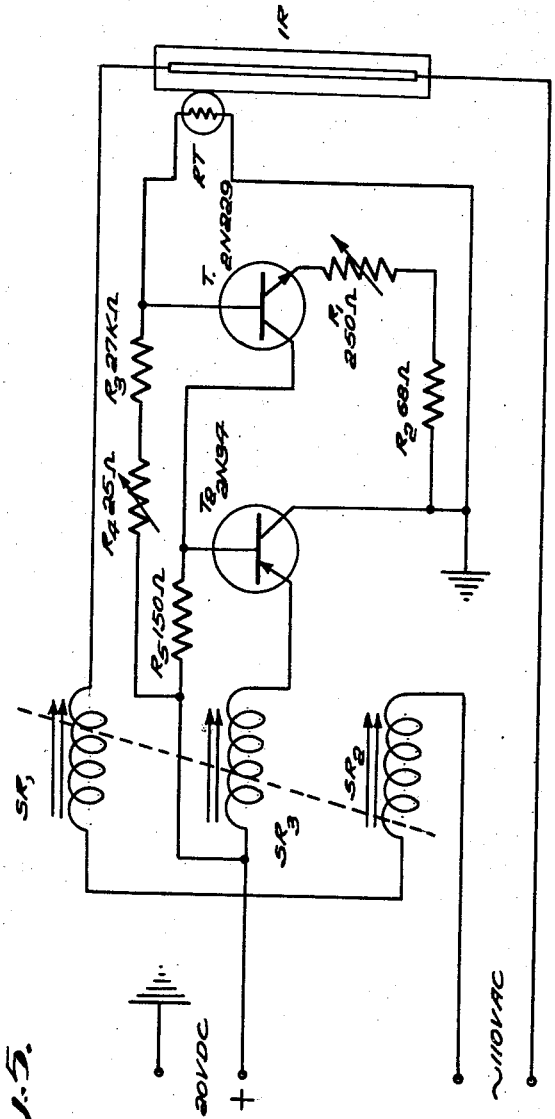
INVENTOR.
ELMER HENRY LUSEBRINK,
BY
AGENT United States Patent Office 3,189,729
Patented June 15, 1965

3,189,729
PROCESS ROLL SYSTEM
Elmer Henry Lusebrink, New Shrewsbury, N.J., assignor to E. I. du Pont de Nemours and Company, Wilmington, Del., a corporation of Delaware
Filed Nov. 29, 1962, Ser. No. 240,815
6 Claims. (Cl. 219—469)

This invention relates to thermal process rolls and more particularly it relates to such rolls for thermally treating moving webs. Still more particularly, it relates to such rolls which are quick-heating and of low thermal mass, so that they can go rapidly through successive cold, hot, cold cycles.

Thermal process rolls are widely used in a number of different web processing machines in a variety of industrial applications. For example, many calendering and laminating operations, treatments of textiles, drying of paper webs, etc. rely on the use of heated rolls. Generally, these rolls are of considerable mass and are designed to maintain a certain elevated temperature over a long period of time to afford a uniform treatment of a web of great length. Such rolls are usually heated internally by means of steam or electric heaters. In applications where repeated short, intermittent, thermal web treatments of only a few seconds duration are required these types of rolls do not perform satisfactorily because they require relatively long heat-up times and, because of their considerable heat capacity, maintain the elevated temperature for a considerable length of time after the heating means is de-activated by shutting off the steam or electricity.

An object of this invention is to provide small, heatable, web processing rolls having rapid-heating characteristics. Another object is to provide such rolls that have a low heat capacity, therefore, cool rapidly when the heating means are turned off. A further object is to provide such rolls that maintain a desired temperature within a narrow limit. A still further object is to provide such rolls capable of progressing rapidly through a succession of short hot and cold cycles. Yet another object is to provide such rolls that are inexpensive, easy to manufacture and require no maintenance. These and other objects will become apparent in the course of the following specification and claims.

These and other objects are accomplished by a thermal process roll system which comprises a sealed heated process roll freely rotatable along its longitudinal axis, means for generating radiation within said heated process roll, means for absorbing radiation on the surface of said heated process roll, compressible means for rotating said heated process roll having low thermal conductivity and low thermal capacity and means for controlling the radiation within said heated process roll responsive to the temperature of the surface of said heated process roll.

The invention will be more clearly understood by reference to the drawings.

FIGURE 1 represents a view in elevation of the thermal process roll system.

FIGURE 2 represents a cross-section of a preferred roll.

FIGURE 3 represents a cross-section of a different embodiment of the process roll.

FIGURE 4 shows schematically the electrical interconnection of the various parts of the heating and temperature control sections.

FIGURE 5 shows the wiring diagram for a suitable temperature control circuit.

Referring now to FIGURE 1, the rapid-heating process roll 1 is mounted in brackets 4 and 5 by means of the floating bearings 6 and 7. In the preferred embodiment, the heated process roll 1 is made of a gas filled quartz tube having an outside coating of infrared absorbing material and an infrared emitting filament inside the tube body. The ends of the heated process roll 1 are sealed and provided with slip rings 8 and 9 connected to either end of the filament 11. Electrical energy is supplied to the filament 11 by means of the slip rings 8, 9 and outside contacts (not shown). A temperature sensing element 10 contacts the infrared absorbing surface 13 of the heated process roll 1 and serves to regulate the supply of electrical energy as a function of the roll temperature.

Two backup rolls 2 and 3 of compressible material, such as felt covered steel rolls, are supported in the brackets 4 and 5 by means of suitable bearings. These backup rolls 2 and 3 are in surface contact with the heated process roll and are power driven so that the heated process roll 1 rotates by frictional engagement with these backup rolls 2 and 3. One of the backup rolls 2 or 3 can be spring loaded to insure good contact with the heated process roll 1.

FIGURE 2 shows a cross-section of a preferred heated process roll 1. It consists of a central infrared emitting filament 11 enclosed in a tubular envelope of infrared transmitting material 12, coated on the outside with an infrared absorbing substance 13. The preferred infrared transmitting material is quartz and the radiation absorbing coating consists of finely divided carbon dispersed in an epoxy resin binder. The heated process roll 1 is sealed and preferably filled with inert gas, such as, argon or nitrogen. A convenient method of making such a process roll is to employ a conventional infrared-quartz tube lamp having disc type filament supports spaced along the lamp and held in position by some means to prevent movement, so that filament sagging does not occur when the lamp is heated. Such lamps are available in commerce, and can be coated as described and fitted with slip rings to provide a rotatable process roll in which the filament is adequately supported during rotation.

FIGURE 3 shows a cross-section of another embodiment of the heated process roll 1. The infrared emitting filament 11 is enclosed in a tubular, thin-walled, metal roll 14 which is sealed and preferably gas-filled.

FIGURE 4 shows schematically the electrical interconnection of the various components. The heated process roll 1 is connected to a current modulator circuit capable of regulating the electrical power. A heat sensing element 10 measures the temperature of the surface of the heated process roll 1. The signal furnished by the heat sensing element 10, after proper amplification, is fed into the current modulator circuit and used to regulate the power supply of the heated process roll 1.

FIGURE 5 shows a suitable current modulator using a saturable reactor driven by a transistor and using the amplified signal from a thermistor (temperature sensing element 10). The two A.C. windings $SR_1$ and $SR_2$ of the saturable reactor are connected in series with the heated process roll 1. A thermistor RT (10 in FIGURE 1) senses the temperature of the heated process roll 1 surface. The voltage drop across the thermistor, which is inversely proportional to the heated process roll 1 temperature change, is amplified by the n-p-n transistor $T_1$. The current change thus produced in the resistor $R_5$ is amplified by the p-n-p transistor $T_2$ and used to drive the D.C. winding $SR_3$ of the saturable reactor. This, in turn, changes the degree of saturation of the reactor core and thus modulates the power supplied to the heated process roll 1. If the temperature of the heated process roll 1 increases, the voltage drop across the thermistor decreases, reducing the degree of saturation of the reactor core, thus decreasing the power supplied to the heated process roll 1. The desired heated process roll 1 temperature can be attained by properly adjusting the variable resistances $R_1$ and $R_4$. The diagram shows typical values of the various components. As it is obvious to one skilled in the art, these values may be changed if different types of transistors are used.

Another suitable control circuit uses a full wave phase controlled A.C. switch using a silicon control rectifier and a thermistor as the temperature sensing element 10. This circuit is described on page 94 of a brochure entitled "Controlled Rectifier Manual", published by the General Electric Co. 1960. Other temperature control systems are equally useful, for example, circuits using transistors as current modulators or arrangements using relays.

The preferred amplifier and current control circuits use transistors for their known advantages, i.e., immediate readiness without warmup period, small size and light weight, low standby power, etc. However, electron tubes can be used by properly adapting the circuits to these devices.

The preferred temperature sensing element 10 is a thermistor, i.e., a resistor with a negative temperature characteristic. Other devices are equally useful, e.g., thermocouples, but they may require some changes in the electrical circuits, depending on the temperature characteristic of the device used. Contact thermometers can be used but they are not preferred.

In the preferred embodiment, using a quartz roll coated with infrared absorbing material as the heated process roll 1, the infrared radiation emitted from the filament 11 passes through the quartz wall which absorbs only a very small amount of this radiation. However, the outside coating of the roll absorbs essentially all the radiation and converts it to heat. Thus, the heat is generated at the surface of the roll from where it can readily be transferred to a web which is in intimated contact with the roll surface. The absorbing coating is very thin, of the order of 0.1 to 1 mil thick. Therefore, the desired surface temperature of the heated process roll 1 can be attained very rapidly and the surface cools rapidly if the power supply to the infrared source is turned off. The infrared absorbing coating can be applied to the inside of the tubular quartz roll, but this is not a preferred embodiment. A typical roll of this type, having 10 inches of usable roll length and being of ⅜ inch diameter, attains an operating temperature of 125° C. from a cold start (15° C.) in less than 2 seconds, requiring a total heat energy of 2400 joules. Once heated, the operating tempreature is maintained with a power input of 50 va.

As indicated above, the preferred heated process roll 1 of this invention is made of quartz, has an infrared absorbing coating and comprises an internal, infrared emitting filament. The preferred quartz roll can be replaced by a hollow, thin-walled metal roll. The invention is not limited to the use of infrared radiation. Any type of radiation in combination with an opaque process roll can be used, i.e., visible light or ultraviolet light.

The combination of a transparent roll and an opaque coating is particularly useful because the conversion from radiant energy to heat energy takes place at the roll surface in immediate contact with the web to be processed. A thin absorbent coating has a low thermal mass, therefore, it heats up quickly with a minimum of temperature overrun. Suitable coating materials are abrasion resistant, tough, opaque and do not soften at the required process temperature. Epoxy paints containing radiation-absorbing pigments were found to be especially useful for this purpose. Other coating materials include pigmented polyester resins or pigmented, polymerizable monomeric compounds which are applied to the roll and then polymerized. Alternately, the rolls can be plated with metals by evaporation or chemically, but frequently such platings do not have the required abrasion resistance. Metal platings also have a tendency to flake or peel off the quartz tube because of the difference in the coefficient of thermal expansion.

Suitable radiation-absorbing pigments to be used in an epoxy or polyester resin binder are those that absorb virtually all the radiant energy transmitted through the radiation-transparent roll body. The preferred pigment is carbon black, but other materials are equally satisfactory, e.g., finely divided silver, iron, copper, iron oxide, copper oxide, etc. Organic pigments are not preferred because usually their absorption is lower than that of the materials mentioned above and they can undergo chemical changes or react with the web material at the elevated process temperature.

The process roll system of this invention are useful for many applications where a moving web must be thermally treated. They are particularly useful in office copy machines of the thermal transfer type in which an image of an original is produced on a receptor sheet by performing a thermal transfer operation from a selectively photopolymerized matrix material. A machine of this type is disclosed in assignee's copending patent application Serial No. 234,616, filed November 1, 1962. Suitable photopolymerizable matrix materials are disclosed in U.S. patent applications Burg and Cohen Serial No. 831,700 filed August 5, 1959, U.S. Patent 3,060,023, Oct. 23, 1962; Burg and Cohen, Serial No. 163,078 filed December 29, 1961; Heiart, Serial No. 123,651, filed July 13, 1961; Cohen and Luebbe, Serial No. 156,518, filed December 1, 1961.

The process roll system of this invention has many advantages over the prior art. The rolls are rapid-heating and self-regulating. They are relatively inexpensive, but highly efficient. The control circuitry is simple, small, and of low weight so it can easily be built into small equipment. The roll system can handle webs of any length, single sheets or rolls. The temperature is controlled according to the demand so that heating cycles of a few seconds or of any longer time can be maintained.

Many other modifications within the scope of the present invention will be obvious to those skilled in the art without departure from the inventive concept.

What is claimed is:
1. A machine for heating sheets comprising
   (a) a sealed hollow roll that is freely rotatable along its longitudinal axis, said roll
       (1) containing means for generating infrared radiation,
       (2) containing an inert gas, and
       (3) having on its surface means for absorbing infrared radiation; and
   (b) means for controlling the amount of infrared radiation generated in the roll in response to the temperature of the surface of the roll; and
   (c) driven rolls adjacent to said sealed roll having compressible surface in frictional engagement with the surface of the sealed roll for rotating said latter roll.

2. A machine according to claim 1 in which the roll is made of quartz and has an infrared radiation absorbing outer surface.

3. A machine in accordance with claim 1 wherein said radiation absorbing surface consists of finely divided carbon dispersed in an epoxy resin binder.

4. A machine in accordance with claim 1 wherein said radiation generating means is an infrared emitting filament.

5. A machine in accordance with claim 1 in which said means for controlling the radiation within said heated process roll is a modulating type temperature controller employing closed loop feed-back means.

6. A machine according to claim 1 in which the means for controlling the infrared radiation comprises a thermistor in contact with the surface of said roll, an amplifier connected to said thermistor the output of which controls a saturable reactor, which in turn controls the heating current supplied to the process roll.

References Cited by the Examiner
UNITED STATES PATENTS

| | | | |
|---|---|---|---|
| 1,950,668 | 3/34 | Gigliotti | 219—244 |
| 2,332,099 | 10/43 | McKinnis | 21—54 |
| 2,720,579 | 10/55 | Morgan | 219—503 |
| 2,752,473 | 6/56 | Hage | 219—497 |
| 2,769,076 | 10/56 | Bogdan | 219—497 |

RICHARD M. WOOD, *Primary Examiner.*
ANTHONY BARTIS, *Examiner.*